United States Patent

Higashijima et al.

Patent Number: 5,617,010
Date of Patent: Apr. 1, 1997

[54] OVERCHARGE AND OVERDISCHARGE PROTECTION FOR A CHARGEABLE ELECTRIC CELL OPERABLE WITH A REDUCED CURRENT CONSUMPTION

[75] Inventors: Yasuhisa Higashijima; Masaru Takeuchi, both of Atsugi, Japan

[73] Assignee: Mitsumi Electric Co., Ltd., Tokyo, Japan

[21] Appl. No.: 495,721

[22] Filed: Jun. 27, 1995

[30] Foreign Application Priority Data

Jul. 6, 1994 [JP] Japan ................................. 6-154573

[51] Int. Cl.$^6$ ....................................................... H02J 7/06
[52] U.S. Cl. ..................................................... 320/31; 320/5
[58] Field of Search ................................... 320/5, 12, 13, 320/14, 29, 30, 31, 39, 48, 49; 361/86, 15

[56] References Cited

U.S. PATENT DOCUMENTS

| | | | |
|---|---|---|---|
| 5,206,578 | 4/1993 | Nor | 320/14 |
| 5,519,563 | 5/1996 | Higashijima | 320/40 X |
| 5,526,215 | 6/1996 | Higashijima | 361/86 |

*Primary Examiner*—Edward H. Tso
*Attorney, Agent, or Firm*—Frishauf, Holtz, Goodman, Langer & Chick

[57] ABSTRACT

A protection circuit for an electric cell comprises an overcharge detection circuit (43-1, 43-2) and an overdischarge detection circuit (44-1, 44-2) both of which are connected to a chargeable electric cell (41, 42) to detect an overcharged condition and an overdischarged condition of the electric cell (41, 42), respectively. A switch (S11, S12) is inserted in a power supply line of the chargeable electric cell (41, 42) and is turned off, when the overcharge detection circuit (43-1, 43-2) or the overdischarge detection circuit (44-1, 44-2) detects the overcharged or the overdischarged condition, thereby inhibiting a charging or a discharging operation. At least the overcharge detection circuit (43-1, 43-2) of the above-mentioned two detection circuits (43-1, 43-2, 44-1, 44-2) is connected to a timing signal producing circuit (45) for supplying a first timing signal having a first duration t1 for defining an operation timing thereof, and to a processing circuit (46) for processing an output signal of the overcharge detection circuit (43-1, 43-2) activated by the first timing signal to judge the presence or absence of an overcharged condition and for turning off the switch (S11) upon Judgement of the presence of the overcharged condition.

5 Claims, 4 Drawing Sheets

OVERCHARGE AND OVERDISCHARGE PROTECTION FOR A CHARGEABLE ELECTRIC CELL OPERABLE WITH A REDUCED CURRENT CONSUMPTION

BACKGROUND OF THE INVENTION

This invention relates to a protection circuit for protecting a chargeable electric cell such as a lithium ion cell by detecting overcharge or overdischarge of the cell.

Among various types of chargeable electric cells, a lithium ion cell is particularly weak against overcharge or overdischarge. In this connection, it is essential to provide a protection circuit for detecting an overcharged condition and an overdischarged condition to inhibit a charging operation and a discharging operation, respectively. For this purpose, the protection circuit comprises two kinds of voltage detection circuits including an overcharge detection circuit and an overdischarge detection circuit.

A cell unit is formed by a combination of the lithium ion cell or cells and the protection circuit. In the cell unit, for example, two lithium ion cells (hereinafter simply called cells) are connected in a cascading manner with respect to each other. Each of the cells is connected in parallel to an overcharge detection circuit and an overdischarge detection circuit. The number of cells may be one or three or more. In any event, each cell is connected in parallel to one overcharge detection circuit and one overdischarge detection circuit. A charging device for carrying out a charging operation is connected between an input terminal and an output terminal of the cell unit. In addition, a load for use in a discharging operation is connected between the input terminal and the output terminal of the cell unit.

Each overcharge detection circuit is provided for comparing a terminal voltage of each cell with a first reference voltage. When the terminal voltage is higher than the first reference voltage, it is judged that the cell is overcharged. At that time, a first switch for switching electrical connection and disconnection of the charging device is turned off. Thus, the charging device is electrically disconnected from the cells to inhibit the charging operation.

On the other hand, each overdischarge detection circuit is provided for comparing the terminal voltage of each cell with a second reference voltage. When the terminal voltage is lower than the second reference voltage, it is judged that the cell is overdischarged. At that time, a second switch for switching electrical connection and disconnection of the load is turned off. Thus, the load is electrically disconnected from the cells to inhibit the discharging operation.

In each of the overcharge detection circuits and the overdischarge detection circuits, comparison of the voltages is carried out by the use of a comparing circuit. The comparing circuit comprises a reference voltage generating Zener diode connected to a constant-current source, two bleeder resistors, and a comparator.

The accuracy in detection or judgement of each of the overcharged and the overdischarged conditions by the overcharge and the overdischarge detection circuits is dependent upon a comparison accuracy of the comparing circuit. In turn, the comparison accuracy is determined by an accuracy of the reference voltage, a resistance ratio of the two bleeder resistors, and an offset voltage of the comparator.

In the case where the comparing circuit is implemented by an IC, a band gap Zener diode is often used as the reference voltage generating Zener diode.

The comparing circuit implemented by the IC is required to have a high comparison accuracy. Practically, due to various factors in the manufacturing process, the comparison accuracy practically achieved in every individual IC fluctuates beyond an allowable range. In this connection, various values in every IC as manufactured are adjusted by a trimming technique as well known in the art so as to make the comparison accuracy of every IC coincide with a designated value. In addition, it is proposed to use a circuit for reducing fluctuation arising in the manufacturing process. Furthermore, various improvements have been made as regards patterning.

For example, in order to achieve a high accuracy in matching of differential pair transistors composing the comparator, transistor patterns are increased in size. In addition, the transistor patterns are arranged in an improved arrangement, for example, in an alternate arrangement so as to reduce the influences of configuration and stress. On the other hand, resistor patterns are formed to have a uniform length and are a uniform width and arranged in an improved arrangement.

It is noted here that the resistor patterns are preferably widened in order to increase the accuracy of the resistance ratio, which is one of those the factors determining the comparison accuracy. This means that the resistor patterns have a high resistance. In addition, in order to reduce a current consumption, a high resistance is required also. If the resistor patterns are increased in width so as to obtain such a high resistance, a greater area is required within the IC. However, in the cell unit of the type described, it is general that reduction in current consumption is more important than reduction in size. In this connection, the comparing circuit of the conventional protection circuit uses a high resistance in order to reduce a current consumption as a first priority.

SUMMARY OF THE INVENTION

It is an object of this invention to provide a protection circuit for an electric cell which is capable of further reducing a current consumption as compared with a conventional circuit.

According to this invention, there is provided a protection circuit for an electric cell, comprising an overcharge detection circuit and an overdischarge detection circuit both of which are connected to a chargeable electric cell to detect an overcharged condition and an overdischarged condition of the electric cell, respectively. A switch is inserted in a power supply line of the chargeable electric cell and is turned off when the overcharge detection circuit or the overdischarge detection circuit detects the overcharged condition or the overdischarged condition, thereby inhibiting a charging or a discharging operation. At least the overcharge detection circuit of the overcharge and the overdischarge detection circuits are connected to timing signal supplying means for supplying a first timing signal having a first duration t1 for defining an operation timing thereof, and a processing circuit for processing an output signal of the overcharge detection circuit activated by the first timing signal to judge the presence or absence of an overcharged condition and for turning off the switch upon judgement of the presence of the overcharged condition.

DESCRIPTION OF THE PREFERRED EMBODIMENT

Figure 1:
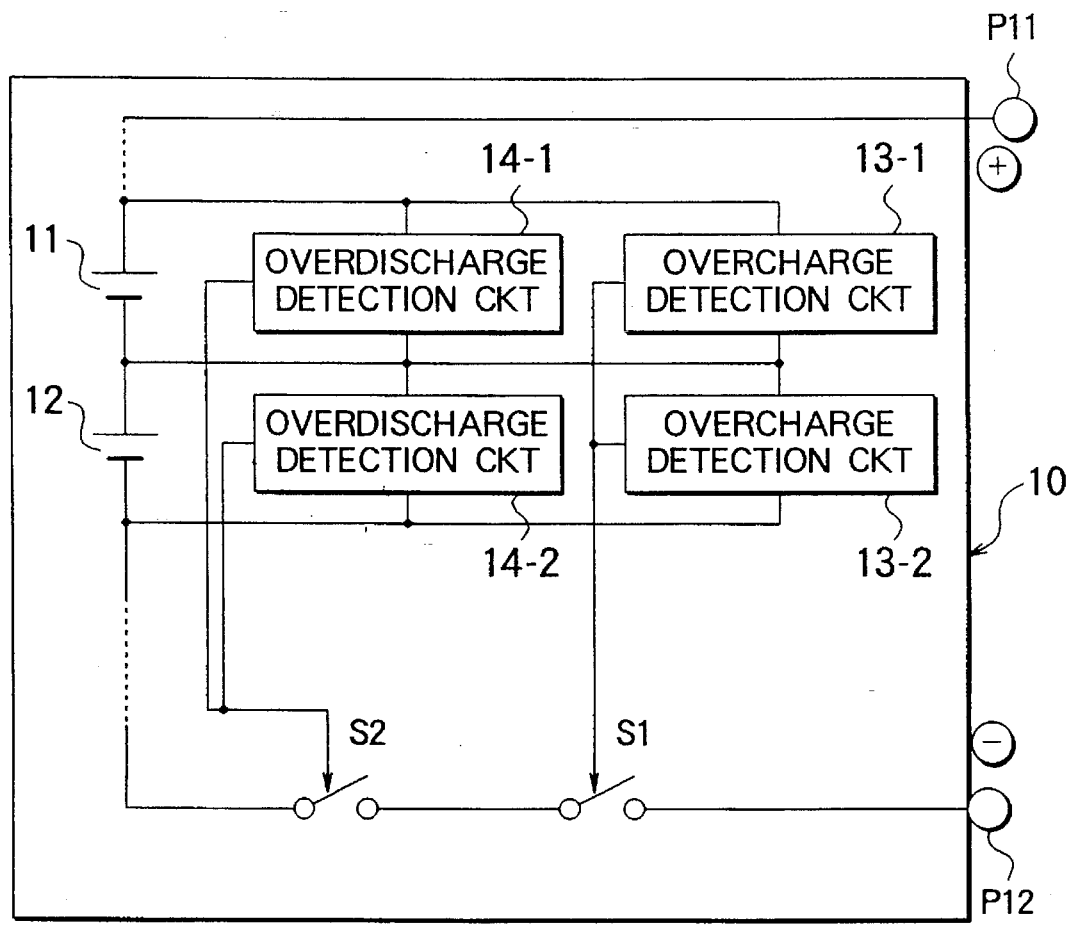
FIG. 1 is a block diagram of a conventional cell unit.
Figure 2:
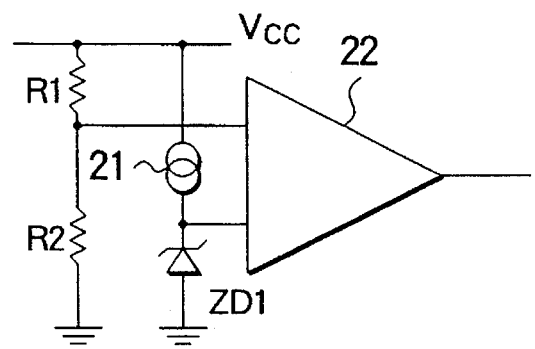
FIG. 2 shows a comparing circuit contained in an overcharge detection circuit illustrated in FIG. 1.

Referring to FIGS. 1 and 2, description will at first be made as regards a conventional cell unit in order to facilitate an understanding of this invention.

FIG. 1 shows a cell unit 10 comprising a two lithium ion cells 11 and 12 connected in cascade to each other, and a conventional protection circuit. Overcharge detection circuits 13-1 and 13-2 and overdischarge detection circuits 14-1 and 14-2 are connected in parallel, respectively, to the cells 11 and 12. The number of the cells may be one or three more. In any event, each cell is connected in parallel to one overcharge detection circuit and one overdischarge detection circuit. In order to carry out a charging operation, a charging device (not shown) is connected between input and output terminals P11 and P12 of the cell unit 10. When a load (not shown) is connected to the input and the output terminals P11 and P12, a discharging operation is started. Switches S1 and S2 are inserted in a power supply line extending between the input terminal P11 and the output terminal P12. More specifically, the switches S1 and S2 are interposed between the cell 12 and the output terminal P12. The switches S1 and S2 are turned on during a normal state. Instead of the switches S1 and S2, a single common switch may be used.

In the charging operation, the overcharge detection circuits 13-1 and 13-2 compare terminal voltages of the cells 11 and 12 with a first reference voltage, respectively. When at least one of the terminal voltages is higher than the first reference voltage, the presence of an overcharged condition is judged to turn off the switch S1. Thus, the charging device connected between the input and the output terminals P11 and P12 is electrically isolated from the cells 11 and 12 to inhibit the charging operation.

In the discharging operation, the overdischarge detection circuits 14-1 and 14-2 compare the terminal voltages of the cells 11 and 12 with a second reference voltage, respectively. When at least one of the terminal voltages is lower than the second reference voltage, the presence of an overdischarged condition is judged to turn off the switch S2. Thus, the load connected between the input and the output terminals P11 and P12 is electrically isolated from the cells 11 and 12 to inhibit the discharging operation.

In each of the overcharge detection circuits 13-1 and 13-2 and the overdischarge detection circuits 14-1 and 14-2, comparison of the voltages is carried out by a comparing circuit illustrated in FIG. 2. The comparing circuit comprises a reference voltage generating Zener diode ZD1 connected to a constant-current source 21, bleeder resistors R1 and R2, and a comparator 22. The comparing circuit has a comparison accuracy determined by an accuracy of the reference voltage, a resistance ratio of the bleeder resistors R1 and R2, and an offset voltage of the comparator 22.

In the case where the comparing circuit is implemented by an IC, a band gap Zener diode is often used as the reference voltage generating Zener diode ZD1. In addition, due to various factors in the manufacturing process, the comparison accuracy practically obtained fluctuates beyond an allowable range. In this connection, various values in every IC are adjusted by a trimming technique well known in the art so as to make the comparison accuracy of every IC coincide with a designated value. In addition, it is proposed to use a circuit for reducing fluctuation arising in the manufacturing process. Furthermore, various improvements have been made as regards patterning.

For example, in order to achieve a high accuracy in matching of differential pair transistors composing the comparator 22, transistor patterns are increased in size. In addition, the transistor patterns are arranged in an improved arrangement, for example, in an alternate arrangement so as to reduce the influences of configuration and stress. On the other hand, resistor patterns are formed to have a uniform length and are a uniform width and arranged in an improved arrangement.

It is noted here that the resistor patterns are preferably widened in order to increase the accuracy of the resistance ratio. This means that the resistor patterns have a high resistance. In addition, in order to reduce a current consumption, a high resistance is also required. If the resistor patterns are increased in width so as to obtain such a high resistance, a greater area is required within the IC. However, in the cell unit of the type described, it is general that reduction in current consumption is more important than reduction in size. In this connection, the comparing circuit of the conventional protection circuit uses a high resistance in order to reduce a current consumption as a first priority.

Figure 3:
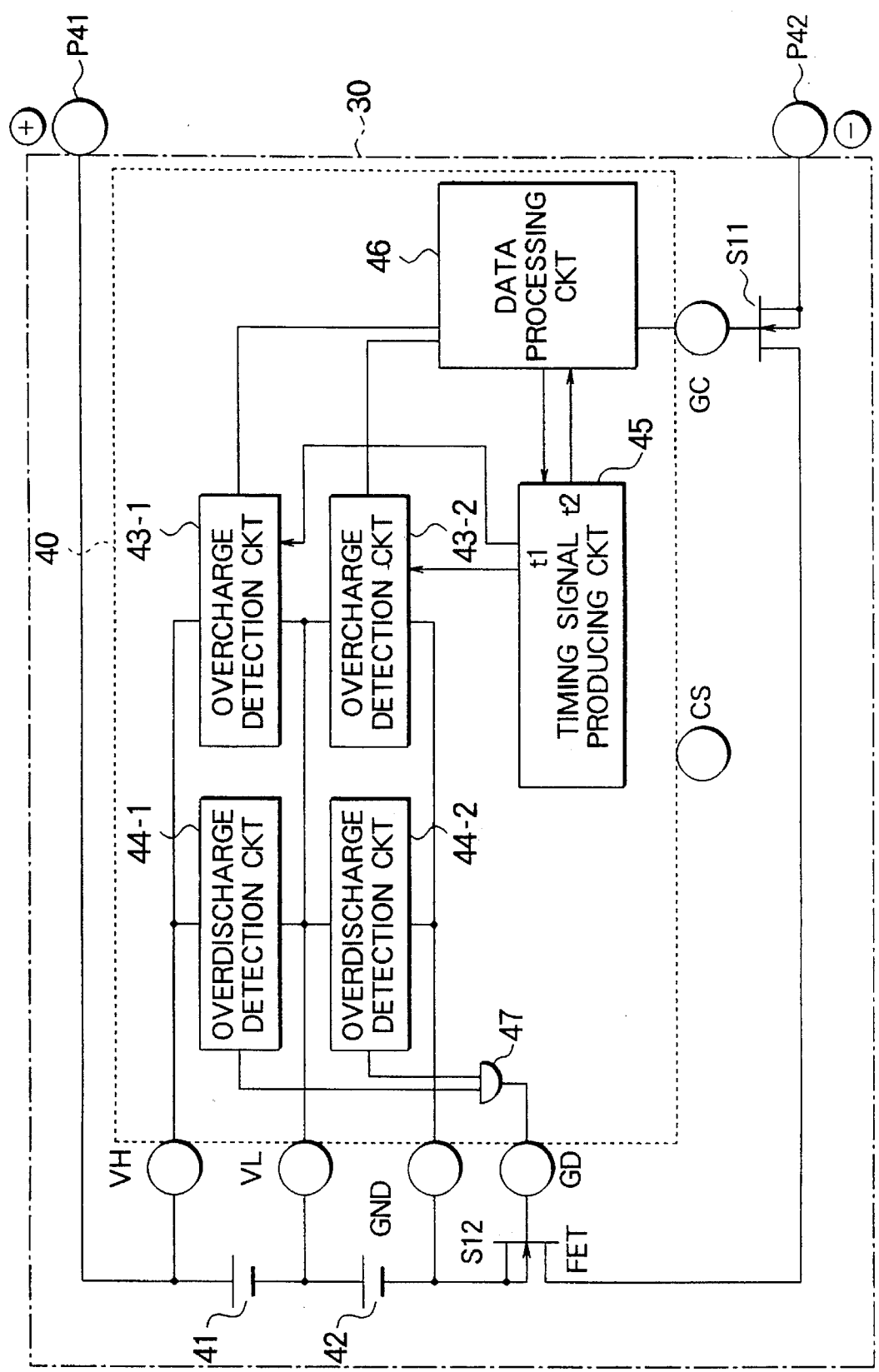
FIG. 3 is a block diagram of a cell unit to which a voltage detection circuit according to a preferred embodiment of this invention is applied.
Figure 4:
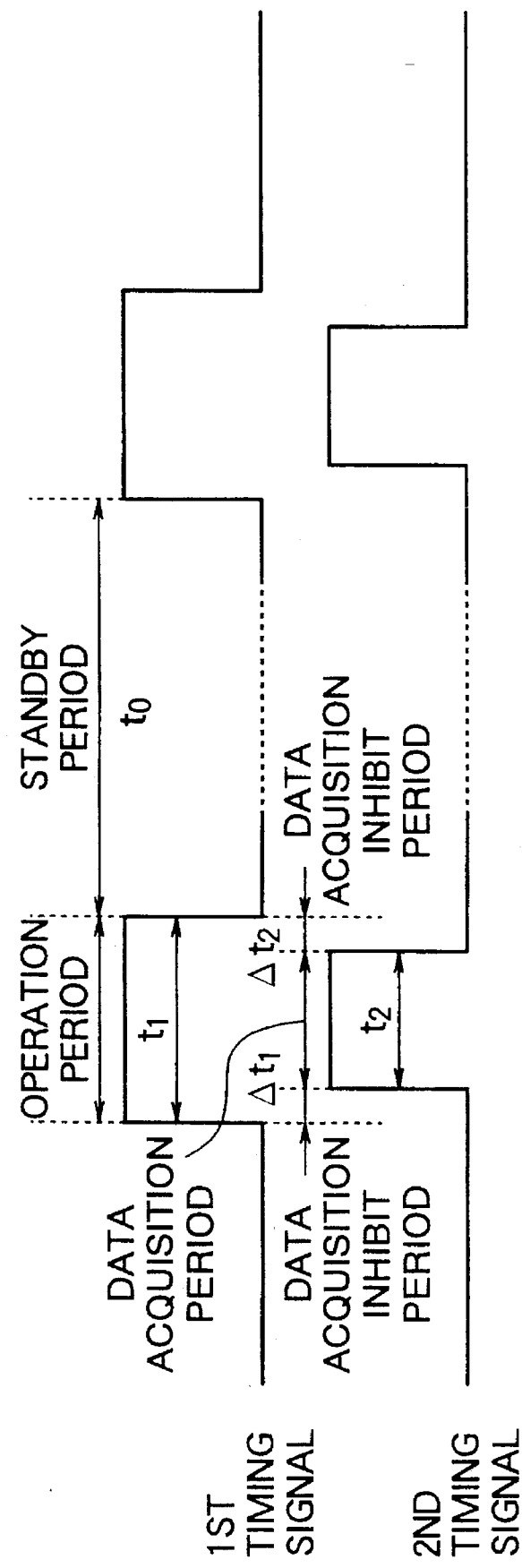
FIG. 4 shows waveform of a first timing signal and a second timing signal supplied from a timing signal generating circuit to an overcharge detection circuit and to a data processing circuit illustrated in FIG. 3, respectively.
Figure 5:
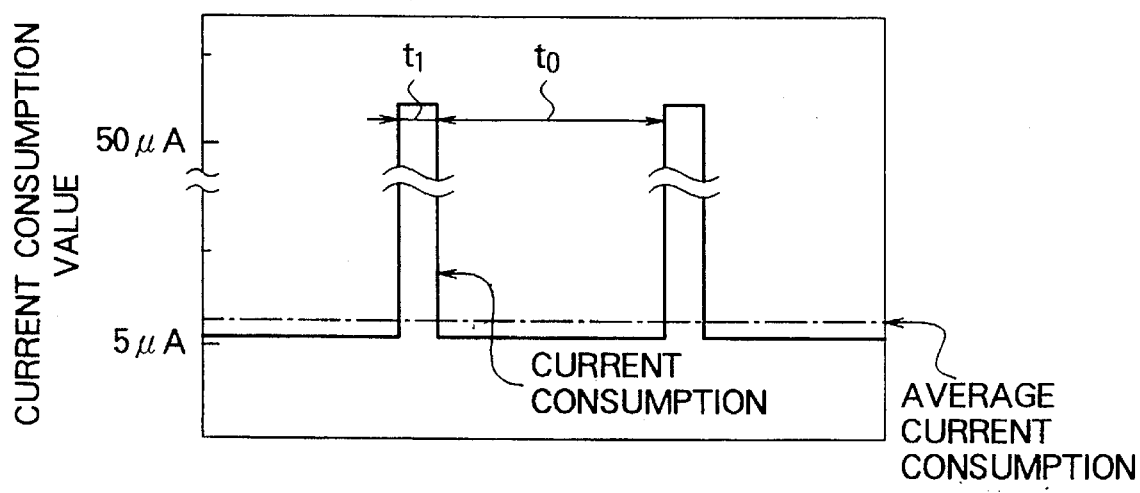
FIG. 5 shows a waveform for describing a current consumption in the overcharge detection circuit illustrated in FIG. 3.

Next, referring to FIGS. 3 through 5, description will proceed with respect to a preferred embodiment of the present invention. Referring to FIG. 3, a cell unit 30 comprises two lithium ion cells (hereinafter simply called cells) 41 and 42 connected in a cascading manner with respect to each other, and a protection circuit.

The protection circuit comprises FET switches S11 and S12 (which will later be described), and a switch control circuit 40 for controlling operation of the FET switches S11 and S12.

The switch control circuit 40 comprises overcharge detection circuits 43-1 and 43-2 for carrying out a voltage monitoring operation with reference to a first reference voltage, overdischarge detection circuits 44-1 and 44-2 for carrying out a voltage monitoring operation with reference to a second reference voltage, a timing signal producing circuit 45 (which will later be described), and a data processing circuit 46 (which will later be described). The overcharge detection circuits 43-1 and 43-2 and the overdischarge detection circuits 441 and 44-2 are connected in parallel to the cells 41 and 42, respectively. The overcharge detection circuits 43-1 and 43-2 and the overdischarge detection circuits 44-1 and 44-2 may be equivalent to those of the conventional protection circuit illustrated in FIG. 1. For example, the switch control circuit 40 is implemented by an IC.

It is noted that a combination of the timing signal producing circuit 45 and the data processing circuit 46 serves as an arrangement for reducing a current consumption of the overcharge detection circuits 43-1 and 43-2 in the switch control circuit 40.

The timing signal producing circuit 45 produces a first timing signal having a first duration t1 (for example, 0.2 ms)

in a predetermined cycle. The first timing signal is supplied to the overcharge detection circuits 43-1 and 43-2 to define an operation timing thereof. The timing signal producing circuit 45 also produces a second timing signal having a second duration t2 in the predetermined cycle. The second timing signal is supplied to the data processing circuit 46 to define an operation timing thereof.

The first and the second timing signals are produced in the manner illustrated in FIG. 4. Specifically, the first duration t1 is greater than the second duration t2. A leading edge of the second timing signal is preceded by a leading edge of the first timing signal while a trailing edge of the second timing signal precedes a trailing edge of the first timing signal. In this manner, the data processing circuit 46 is inhibited from acquiring data from the overcharge detection circuits 43-1 and 43-2 for first and second inhibit period $\Delta$ t1 and $\Delta$ t2 ($\Delta$ t1+$\Delta$ t2=t2−t1) at the start and at the end of the first duration t1, respectively. This is because unstable factors are present at the start and at the end of an operation period of the overcharge detection circuits 43-1 and 43-2.

In the charging operation, the overcharge detection circuit 43-1 is responsive to the first timing signal from the timing signal producing circuit 45 and put into operation to detect an overcharged condition of the cell 41 for every first duration t1 in the predetermined cycle. When the overcharged condition is detected, an overcharge detection signal indicative of the overcharged condition is produced and delivered to the data processing circuit 46. The overcharge detection circuit 43-2 is operated in a similar manner to detect an overcharged condition of the cell 42. Likewise, the overcharge detection circuit 43-2 produces an overcharge detection signal upon presence of the overcharged condition.

The overcharge detection circuit 43-1 includes an overcharge detection resistor (not shown) and a switch (not shown) for turning on and off a circuit formed between the resistor and the cell 41. The switch is turned on only during every first duration t1 in the predetermined cycle. Accordingly, no current flows through the overcharge detection resistor during a standby period t0 in which the overcharge detection circuit 43-1 is not operated. The overcharge detection circuit 43-2 has a similar structure.

On the other hand, the data processing circuit 46 is responsive to the second timing signal and put into operation for the second duration t2 contained in the first duration t1 during which the overcharge detection circuits 43-1 and 43-2 are put into operation. In operation, the data processing circuit 46 monitors the presence or absence of the overcharge detection signal from each of the overcharge detection circuits 43-1 and 43-2. When the overcharge detection signal is supplied from at least one of the overcharge detection circuits 43-1 and 43-2 during monitoring, the data processing circuit 46 produces a gate control signal to turn off the FET switch S11. Thus, the cells 41 and 42 are electrically isolated from a charging device (not shown) connected between input and output terminals P41 and P42 to thereby inhibit the charging operation.

In the discharging operation, the overdischarge detection circuits 44-1 and 44-2 continuously monitor voltages of the cells 41 and 42, respectively, in the manner similar to the conventional protection circuit. During monitoring, a high level signal is produced when the voltage is not lower than the second reference voltage. On the other hand, when the voltage is lower than the second reference voltage, the presence of an overdischarged condition is judged and a low level signal is produced as an overdischarge detection signal. Herein, outputs of the overdischarge detection circuits 44-1
and 44-2 are connected through a two-input AND gate 47 to the FET switch S12. With this structure, the FET switch S12 is turned off when the overdischarge detection signal of a low level is produced from at least one of the overdischarge detection circuits 44-1 and 44-2. As a consequence, the cells 41 and 42 are electrically isolated from a load (not shown) connected between the input and the output terminals P41 and P42 to thereby inhibit the discharging operation. As described above, the low level signal is used as the overdischarge detection signal. This is because it is preferable to minimize an electric power consumption in the overdischarge detection circuits 44-1 and 44-2 while the cells 41 and 42 are detected to be in the overdischarged condition.

In this embodiment, the switch control circuit 40 is implemented by a single-chip IC and has terminals VH, VL, GND, GD, CS, and GC for connection with various components in the cell unit 30.

As is obvious from FIG. 4, the first duration t1 in which the overcharge detection circuits 43-1 and 43-2 are put into operation and the standby period t0, in which the overcharge detection circuits 43-1 and 43-2 are inactive, have a relationship defined by t1<<t0, for example, t1:t0=1:10 in this embodiment. Accordingly, even if a current consumption during operation is considerably large as illustrated in FIG. 5, an average current consumption is substantially reduced. This means that a comparing circuit does not require such a high resistance as in the conventional circuit because a current consumption during operation of the overcharge detection circuits 43-1 and 43-2 can be large.

In this embodiment, only the overcharge detection circuits 43-1 and 43-2 are cyclically turned on and off. This is because the overcharge detection circuits 43-1 and 43-2 are required to have a high precision as compared with the overdischarge detection circuits 44-1 and 44-2 and therefore consume a large current. In this connection, a cyclic on/off operation of the overcharge detection circuits 43-1 and 43-2 has a greater effect of reducing an electric power consumption. As regards the overdischarge detection circuits 44-1 and 44-2 on the other hand, a current value can be reduced by the use of a high resistance. However, the overdischarge detection circuits 44-1 and 44-2 may be cyclically turned on and off by provision of a similar structure containing the timing signal producing circuit 45 and the data processing circuit 46.

In this embodiment, the data processing circuit 46 includes a counter circuit and a latch circuit. The counter circuit is located at a preceding stage of the latch circuit and has a so-called filtering effect. Specifically, the counter circuit counts the number of the overcharge detection signals from each of the overcharge detection circuits 43-1 and 43-2. After detection of a predetermined number of overcharge detection signals consecutively produced, it is judged that a "valid" overcharge detection signal is supplied. In other words, the overcharge detection circuits 43-1 and 43-2 are insensitive before detection of a predetermined number of overcharge detection signals consecutively produced. The "valid" overcharge detection signal is delivered to the latch circuit at a succeeding stage. With this structure, it is possible to avoid an operation error in an apparent overcharged condition temporarily caused by voltage fluctuation at the start of the charging operation, a noise, and so on and to achieve a reliable overcharge detecting operation. It will be understood that judgement of the overcharged condition can be made after reception of a desired number of the overcharge detection signals. In this structure, an insensitive period is determined by a product of the standby period t0 (for example, 10 ms) and the number of times of detection of the overcharge detection signals. Thus, the insensitive period can be desiredly determined in correspondence to the number of times of detection of the overcharge detection signals.

On the other hand, when the overcharge detection circuits 43-1 and 43-2 carry out an intermittent operation as described above, the latch circuit holds or latches the overcharge detection signal during the standby period after detection. Likewise, the latch circuit latches the overcharge detection signal after a predetermined number of times of reception from the counter circuit.

In this invention, the charging operation is inhibited when at least one of the cells is turned into the overcharged state. Likewise, the discharging operation is inhibited when at least one of the cells is turned into the overdischarged state. It is proposed here that, when the discharging operation is inhibited, the timing producing circuit 45 is turned off so as to reduce a current consumption thereof. In this structure, it is essential that the timing producing circuit 45 is supplied with a signal for maintaining a bias current to maintain the overcharge detection signal for any other cell. The reason is as follows.

Because the cell unit contains a plurality of cells, any one of the cells is possibly turned into the overcharged condition simultaneously when any of the remaining cells is turned into the overdischarged condition. In such an event, if the overcharge detection signal for an overcharged cell is not maintained, the overcharged cell is further charged together with the other overdischarged cells. After repetition of such operation, the overcharged condition of the overcharged cell becomes more and more serious. In order to avoid the above-mentioned state, the timing producing circuit 45 is supplied with the signal for maintaining the bias current to maintain the overcharge detection signal.

In the above-mentioned embodiment, the data processing circuit 46 makes the FET switch S11 be turned off when the latch circuit contained therein carries out a latching operation. In addition, the data processing circuit 46 supplies a bias current to the timing signal producing circuit 45 to maintain the operation of the overcharge detection circuits 43-1 and 43-2. This is because, in the case of the above-mentioned structure in which the timing signal producing circuit 45 is turned off, the overcharge detection signal must be maintained in case where at least one of the cells is turned into the overdischarged condition simultaneously when at least one of the other cells is turned into the overcharged condition. If the overcharge detection signal is not maintained, the charging operation is carried out during the insensitive period as determined. This results in an increase of the cell voltage.

In the case where the cell unit 30 is used in combination with a microcomputer or the like, use can be made of a clock signal from the microcomputer. Accordingly, the timing signal producing circuit 45 can be dispensed with.

The present invention is applicable not only to the lithium ion cell but also to any other chargeable cell which requires protection against overcharge and overdischarge.

As described, in the protection circuit comprising the overcharge detection circuits and the overdischarge detection circuits, at least the overcharge detection circuits having a large current consumption are cyclically turned on for a short time period. Thus, it is possible according to this invention to considerably reduce the electric power consumption accompanying the detecting operation. This enables the device of the present invention to suppress a reduction of a cell capacity during non-use of the cell unit and to increase a capacity used by the load.

What is claimed is:

1. A protection circuit for an electric cell, comprising:

an overcharge detection circuit coupled to a chargeable electric cell, said overcharge detection circuit detecting an overcharged condition of said chargeable electric cell and outputting an overcharge detection signal responsive thereto;

an overdischarge detection circuit coupled to said chargeable electric cell, said overdischarge circuit detecting an overdischarged condition of said chargeable electric cell and outputting an overdischarge detection signal responsive thereto;

a switch inserted in a power supply line of said chargeable electric cell, said switch being activated responsive to the output of said overcharge and overdischarge detection signals to thereby respectively inhibit one of a charging operation and a discharging operation of said chargeable electric cell;

a timing signal supplying means, coupled to at least said overcharge detection circuit, for supplying a first timing signal having a first operation timing duration t1, said timing signal supplying means cyclically supplying said first timing signal at a time interval t0, wherein t1<<t0; and a processing circuit for processing an output signal of said overcharge detection circuit activated by said first timing signal to judge a presence or an absence of an overcharged condition, said processing circuit activating said switch upon judgment of the presence of said overcharged condition.

2. A protection circuit as claimed in claim 1, wherein said timing signal supplying means includes means coupled to said processing circuit for supplying said processing circuit with a second timing signal having a second operation timing duration t2, said second timing signal being supplied within a supply period of said first timing signal, and said second timing signal having a leading edge and a trailing edge which are not coincident with a leading edge and a trailing edge of said first timing signal.

3. A protection circuit as claimed in claim 2, wherein said processing circuit includes means for activating said switch responsive to a plurality of consecutive judgements of an overcharged condition.

4. A protection circuit for an electric cell, comprising:

an overcharge detection circuit coupled to a chargeable electric cell, said overcharge detection circuit detecting an overcharged condition of said chargeable electric cell and outputting an overcharge detection signal responsive thereto;

an overdischarge detection circuit coupled to said chargeable electric cell, said overdischarge circuit detecting an overdischarged condition of said chargeable electric cell and outputting an overdischarge detection signal responsive thereto;

a switch inserted in a power supply line of said chargeable electric cell, said switch being activated responsive to the output of said overcharge and overdischarge detection signals to thereby respectively inhibit one of a charging operation and a discharging operation of said chargeable electric cell;

a timing signal supplying means, coupled to at least said overcharge detection circuit, for supplying a first timing signal having a first operation timing duration t1, said timing signal supplying means also being coupled to said processing circuit for supplying said processing circuit with a second timing signal having a second operation timing duration t2, said second timing signal being supplied within a supply period of said first timing signal, and said second timing signal having a leading edge and a trailing edge which are not coincident with a leading edge and a trailing edge of said first timing signal; and a processing circuit for processing an output signal of said overcharge detection circuit activated by said first timing signal to judge a presence or an absence of an overcharged condition, said processing circuit activating said switch upon judgment of the presence of said overcharged condition.

5. A protection circuit as claimed in claim 4, wherein said processing circuit includes means for activating said switch responsive to a plurality of consecutive judgements of an overcharged condition.

* * * * *